United States Patent Office 3,770,708
Patented Nov. 6, 1973

3,770,708
PRESSURE SENSITIVE ADHESIVE COPOLYMER FORMED FROM VINYL MONOMER AND ZWITTERION MONOMER AND TAPES MADE THEREWITH
Hanspeter Knoepfel, Basel, Switzerland, and Spencer F. Silver, White Bear Lake, Minn., assignors to Minnesota Mining and Manufacturing Company, St. Paul, Minn.
No Drawing. Filed Dec. 2, 1970, Ser. No. 94,595
Int. Cl. C08f 15/00
U.S. Cl. 260—80.73        8 Claims

ABSTRACT OF THE DISCLOSURE

Pressure-sensitive adhesives formed by copolymerizing (1) 80–99 weight percent monomer selected from the class of acrylates having 5–17 carbon atoms in the pendant chain, methacrylates having 8–17 carbon atoms in the pendant chain, or vinyl esters based on carboxylic acids containing 4–13 carbon atoms and (2) 1–20 weight percent of terminally-unsaturated zwitterion monomer possess excellent physical properties.

BACKGROUND OF THE INVENTION

This invention relates to pressure-sensitive adhesive compositions and particularly to pressure-sensitive adhesive sheet products including adhesive tape.

Since their introduction into the market, presure-sensitive adhesive sheets and tapes such as masking tapes, mending and sealing tapes, hair care tapes, electrical tapes, packaging tapes and the like have become well known for numerous purposes. The adhesives used in such tapes possess the properties of tack, adhesion and cohesion which are generally interdependent of each other and must be carefully balanced to obtain characteristics desirable for a particular end use. This balance has been accomplished in several manners. For example, elastic materials such as crude rubber have been combined with various tackifiers such as rosin or hydrocarbon resins. Single-component polymers such as homopolymers of the esters of acrylic acid have been used, these polymers exhibiting varying degrees of tackiness depending upon molecular weight and the alcohol or mixture of alcohols from which the esters are prepared.

The acrylate homopolymers are deficient in either aggressive tackiness or cohesive strength with polar comonomers being utilized to overcome these deficiencies. Acrylic esters have been copolymerized with small portions of monomers such as acrylic acid, methacrylic acid, itaconic acid, acrylamide, methacrylamide, acrylic esters, vinyl esters, n-alkoxy-alkyl unsaturated carboxylic acid amides, half esters, half amides, amide esters, amides and imides of maleic anhydride, and the alkylaminoalkylene monoesters of maleic, itaconic or citraconic acids. Such is disclosed, for example, in U.S. Pats. 1,760,820; 3,189,-581; 3,371,071; 3,509,111; Re. 19,128; Re. 24,906.

It has also been proposed to overcome the deficiencies in the tack, adhesive and cohesive properties of acrylic ester polymers through partial cure by incorporation of a formaldehyde condensation product of sulfonamide, phenol, melamine, or urea, benzoyl peroxide; heat crosslinkable comonomers such as methyl methacrylate; functional alcohols, etc., as suggested by U.S. Pats. 2,953,475; 2,973,286; 3,222,419; 3,258,454; 3,284,423; and 3,465,058.

Notwithstanding the utility and commercial success of pressure-sensitive adhesives, there are numerous applications requiring such outstanding shear strength that presently available pressure-sensitive adhesives have not been entirely satisfactory. Thus, there is need for pressure-sensitive adhesives having outstanding shear strength for carton sealing tapes, packaging tapes, can sealing tapes, transfer tapes, etc.

SUMMARY

This invention provides pressure-sensitive adhesive compositions and pressure-sensitive adhesive sheet product having outstanding shear strength combined with excellent tack and peel strength without requiring cure of the adhesive.

In accordance with the invention, normally tacky and pressure-sensitive adhesive compositions having outstanding shear strength combined with excellent tack and peel strength comprise a copolymer comprising at least 80 weight percent of at least one terminally unsaturated vinyl monomer and correspondingly less than 20 weight percent of at least one terminally unsaturated zwitterion monomer. The pressure-sensitive adhesive tapes of the invention comprise the copolymer coated on at least one surface of a flexible backing. The terminally unsaturated vinyl monomer may be selected from the group consisting of acrylic acid esters, methacrylic acid esters, and vinyl esters.

DESCRIPTION OF THE PREFERRED EMBODIMENTS

Although useful pressure-sensitive adhesive copolymers comprise at least 80 weight percent of (1) at least one terminally unsaturated vinyl monomer such as the acrylic acid esters, the methacrylic acid esters, and the vinyl esters and (2) less than 20 weight percent of at least one terminally unsaturated zwitterion monomer, the preferred pressure-sensitive adhesive copolymers comprise 90 to 99 percent of (1) and 1 to 10 percent of (2).

The acrylic acid esters useul in the practice of this invention are the esters of alcohols containing 5 to 17 or more carbon atoms, preferably from 6 to 13 carbon atoms. Examples of suitable esters are the acrylic acid esters of non-tertiary alcohols such as: 2-methylbutanol, 3 - methylbutanol, 2 - ethylbutanol, 2-methylpentanol, 3-methylpentanol, 4 - methylpentanol, 2-ethylpentanol, 3-ethylpentanol, 2 - propylpentanol, n-hexanol, 2-methylhexanol, 3 - methylhexanol, 4-methylhexanol, 5-methylhexane, 2 - hexanol, 2-ethylhexanol, 3-ethylhexanol, 4-ethylhexanol, 4-methyl-2-pentanol, 2,3,4-triethylhexanol, 2,3,5-trimethylhexanol, 2-ethyl-3-methylhexanol, n-heptanol, 2-heptanol, 3-heptanol, 2-methylheptanol, 3-methylheptanol, 4-methylheptanol, 5-methylheptanol, 6-methylheptanol, 2-ethylheptanol, 3-ethylheptanol, 4-ethylheptanol, 5-ethylheptanol, 2-methyl-4-ethylheptanol, n-octanol, iso-octanol, n-nonanol, n-decanol, n-undecanol, n-dodecanol, 7 - phenylheptanol, 10 - phenylundecanol, 10-cyclohexylundecanol, 10-chlorodecanol, and 6-methoxyhexanol, etc., and mixtures thereof.

The methacrylic acid esters useful in the practice of this invention are the esters of non-tertiary alcohols containing 8 to 17 carbon atoms, preferably 9 to carbon atoms. Examples of suitable esters are the methacrylic acid esters of alcohols such as: n-octanol, n-nonanol, 2-methylnonanol, 3-methylnonanol, 4-methylnonanol, 5-methylnonanol, 6-methylnonanol, 7-methylnonanol, 8-methylnonanol, n-decanol, n-undecanol, n-tridecanol, 10-phenylundecanol, 10-cyclohexylundecanol, 10 - chlorodecanol, 6-methoxyhexanol, etc., and mixtures thereof. The methacrylic acid esters are preferably used as a third component of an adhesive composition comprising acrylic acid ester and a minor amount of zwitterionic monomer.

The vinyl esters useful in the practice of the invention are those derived from carboxylic acids containing 4 to 13 carbon atoms and are the esters of such acids as: butyric, caprylic, pelargonic, decanoic, undecanoic, dodecanoic, tridecanoic acids, etc., and mixtures thereof. The vinyl esters are preferably used as a third component of an adhesive composition comprising acrylic acid ester and a minor amount of zwitterionic monomer.

In the context of this invention, zwitterionic monomers are zwitterionic compounds possessing a terminal free radically polymerizable unsaturated group and are described in many texts such as I. Finor, Organic Chemistry, page 486 (1956). In the context of the invention the expression "zwitterionic compound" refers only to compounds such as betaines and aminimides which are internally neutralized and does not include compounds such as aminoacids which have ionic hydrogens or other ions that provide for external satisfaction of the charged sites and which can be considered internally charge satisfied only at their isoelectric point in aqueous solution. The zwitterionic monomers useful in preparing the pressure-sensitive adhesives of the present invention may be represented by the three general structural formulas:

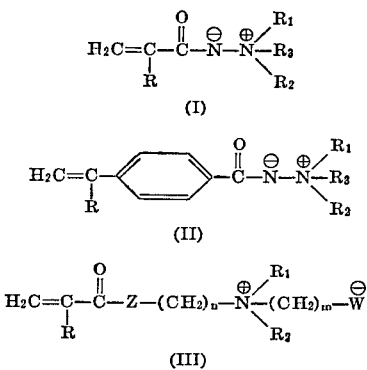

wherein

R represents a hydrogen atom, a lower alkyl group containing 1 to 10 carbon atoms, or a phenyl group;

$R_1$ and $R_2$ represent the same or different lower alkyl groups containing 1 to 10 carbon atoms or together represent a single divalent group that together with the nitrogen atom form a heterocyclic ring;

$R_3$ represents a lower alkyl group; a phenylalkyl group; a 2-hydroxyalkyl group; a 2,3-dihydroxy alkyl group; a 2-hydroxyalkylphenyl group; a 2,3-dihydroxyalkylphenyl group; a 2-hydroxyalkoxyalkyl group; or a 2-hydroxyalkylphenylether group wherein the alkyl group contains 1 to 10 carbon atoms inclusive;

Z represents —O—, —S—, or —NH—

$n$ is an integer from 1 to 5 inclusively, $m$ is an integer from 1 to 8 inclusive, and $W^\ominus$ represents a negatively charged radical selected from the group consisting of —$SO_3^\ominus$, —$PO_3^\ominus$, —$CO_2^\ominus$, —CO—$\overset{\ominus}{N}$—$SO_2$—⟨⟩ and,—CO—$\overset{\ominus}{N}$—$SO_2$—⟨⟩—$CH_3$ It is to be understood that zwitterions of structure formula I are probably tautomeric with another structure (Ia):

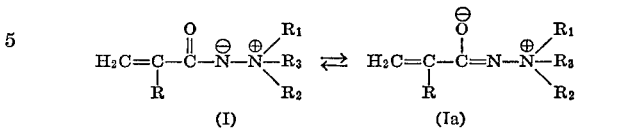

and zwitterions of structure Formula II with IIa:

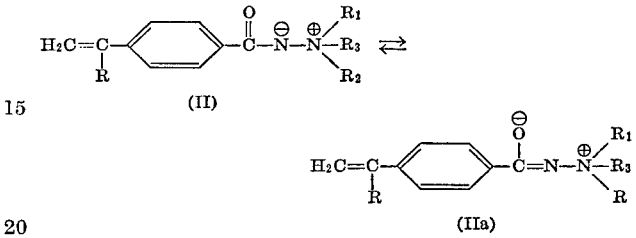

Examples of preferred zwitterionic monomers represented by structural Formulas I and Ia include: trimethylamine methacrylimide; trimethylamine acrylimide, triethylamine methacrylimide; tributylamine methacrylimide; 1,1-dimethyl-1-(2-hydroxypropyl)amine methacrylimide 1,1-dipropyl-1-(2-hydroxypropyl)amine acrylimide; 1,1-dimethyl-1-(2,3-dihydroxypropyl)amine methacrylimide; 1,1-dipropyl-1-(2-hydroxybutyl)amine acrylimide; 1,1-dimethyl-1-(2-hydroxyoctyl)amine methacrylimide; 1,1-dimethyl-1-(2-hydroxy-3-phenoxypropyl)amine methacrylimide; 1,1-dimethyl-1-(2 - hydroxyl - 3 - methoxypropyl)amine methacrylimide and 1,1-dimethyl-1-(2-hydroxy-2-phenylethyl)amine methacrylimide.

Preferred zwitterionic monomers represented by structural Formulas II and IIa include: trimethylamine 4-vinylbenzimide; trimethylamine 4-isopropenylbenzimide; 1,1-dimethyl-1-(2 - hydroxypropylamine) 4-isopropenylbenzimide; and 1,1-dimethyl - 1 - (2-hydroxy-3-phenoxypropyl)amine 4 - vinylbenzimide; 1 - (2 - hydroxyoctyl) amine methacrylimide; 1,1-dimethyl-1-(2-hydroxy-2-phenylethyl)amine methacrylimide.

Preferred zwitterionic monomers represented by structural Formula III include:

3-[(2-acryloxyethyl)dimethylammonium]propionate betaine;

3-[(2-acryloxyethyl)dimethylammonium]propane sulfonate betaine;

3-[(2-methacryloxyethyl)dimethylammonium]propionate betaine;

3-[(2-methacryloxyethyl)dimethylammonium]propane sulfonate betaine.

Zwitterionic monomers represented by the structural Formula I are aminimides and may be prepared by any suitable method such as that described in Belgian Pat. No. 714,629. Aminimide monomers represented by structural Formula I which contain hydroxyl groups may be prepared in accordance with the process described in U.S. Pat. 3,485,806, Belgian Pat. 714,629, Slagel, J. Org. Chem. 33 (4), 1374 (1968), and Culbertson et al., Macromolecules 1 (3), 224 (1968).

Zwitterionic monomers represented by structural Formula II are aminimides and may be prepared by any suitable procedure such as that described by Culbertson et al., J. Poly. Sci.: Part A–1 6, 2197 (1968).

Zwitterionic monomers represented by structural Formula III are betaines and may be prepared in accordance with the process described in U.S. Pat. No. 2,777,872 for the carboxybetaines and in U.S. 3,411,912 for sulfobetaines. The preparation of still other monomers of the general Formula III is described in French Pat. No. 1,518,218.

In general, the pressure-sensitive adhesive copolymers of the invention may be prepared in aqueous emulsion using a batch or continuous process. Polymerization catalysts that may be employed are typical free radical initiators such as alpha, alpha'-azobisisobutyronitrile; alpha, alpha'-azobisisovaleric acid and inorganic peracid salts, such as ammonium persulfate, potassium persulfate, potassium perchlorate, and potassium percarbonate. These catalysts are preferably used in conjunction with reducing agents such as ferrous salts, bisulfites, thiosulfates, hydrosulfites, and tetrathionates. Various types of emulsifiers can be used and may be anionic, cationic, non-ionic or mixtures of ionic and non-ionic. The time and temperatures used to carry out the polymerization vary depending on the particular monomers being copolymerized. Thus, temperatures from about 0° C. to 100° C. or more may be used for times varying from a few minutes to several days. A preferred condition of polymerization is by emulsion polymerization at a temperature of from 20° C. to 70° C. for 1 to 24 hours in an inert atmosphere such as nitrogen or helium. Molecular weight regulators such as tert-dodecyl mercaptan may be used. In certain cases, it is advantageous to carry out the polymerization in the presence of buffers to control the pH of the reaction mixture, e.g., $KH_2PO_4$—$K_2HPO_4$ mixtures.

The pressure-sensitive adhesive copolymers of the present invention are readily prepared in high molecular weight and form viscous solutions in solvents such as n-butanol, tert-butanol, acetone, methylethyl ketone, ethyl acetate, acetonitrile, tetrahydrofuran, chloroform, heptane, benzene, toluene, mixtures thereof, and the like. Useful polymers of the present invention have a minimum intrinsic viscosity of not less than about 1.0 dl./g. in tetrahydrofuran, about 1.5 dl./g. in n-butanol, and about 4.0 dl./g. in tetrahydrofuran.

It is possible to utilize more than one terminally unsaturated vinyl comonomer in the adhesive copolymer. Also, it is possible to utilize more than one terminally unsaturated zwitterionic comonomer in the adhesive copolymer. Adhesive properties such as tack, peel strength, shear strength, etc., may be further modified by copolymerizing about 5 to 20 weight percent of such other monomers as vinyl acetate, acrylonitrile, methyl acrylate, ethyl acrylate, methyl methacrylate, styrene, etc.

It is thought that the outstanding shear strength and high holding power of these tacky and pressure-sensitive adhesive copolymers is a function of "ionic association" between the positively and negatively charged sites of different polymer chains which provide an enhanced internal or cohesive strength and resultant resistance to shear stress. This "ionic association" is clearly not chemical in nature because the copolymers are readily soluble whereas covalent chemical cross-linking would provide an insoluble or difficultly soluble polymer. While this theory provides a plausible explanation of the extraordinary results obtained in the practice of the invention, it may or may not be correct and should in no way be construed as a limitation upon the invention.

The copolymer solutions or latices as obtained from the reaction vessel may be used to prepare useful adhesive products. Alternatively, the copolymer latices may be coagulated by normal procedures with methanol or saturated salt solutions or the like, the solid polymer recovered, and redissolved in solvent. Solvents for the copolymers include heptane, isopropanol, methylethyl ketone, ethyl acetate, tetrahydrofuran, chloroform, benzene, butanol, benzene-methanol mixture and heptane-isopropanol. Non-solvents for the copolymers include water and methanol.

Useful adhesive-coated sheet materials are readily obtained by coating an adhesive copolymer solution or latex onto substrates including films such as polyester and polyvinyl chloride, paper, release liners, and the like and thereafter evaporating the volatiles to obtain a pressure-sensitive adhesive-coated sheet.

The outstanding pressure-sensitive adhesive properties displayed by the copolymer adhesives of this invention are readily measured by standard techniques. The adhesive tack is readily determined by a probe tack apparatus of the type marketed by TMI, Inc. under the trade name "PolykenProbe Tack Tester." In this test the smooth polished end surface of a cylindrical steel probe $\frac{1}{16}$ inch in diameter and the adhesive surface being tested are brought into contact with each other at a controlled test temperature for one second at a contact pressure of 100 gms. per cm.$^2$. The force required to separate the adhesive surface from the probe surface at the controlled temperature is recorded on a force gauge and reported in grams. By making the measurement over a range of temperatures, a temperature is found at which the force reaches a maximum value. This value is the tack maximum reported for the adhesives described in the examples.

The peel adhesion value of the pressure-sensitive adhesives is determined by using Test PSTC–1 described in "Test Methods for Pressure-Sensitive Tapes," 5th edition, published by the Pressure-Sensitive Tape Council, 1201 Waukegan Road, Waukegan, Ill., 60025, U.S.A. For this test, films of the adhesive being evaluated are applied to a polyethylene terephthalate film backing in a dry thickness of 1 mil and slit into 1-inch wide strips of adhesive-coated tape. The tape is then rolled into contact with a glass test panel using a 4.5 pound roller. The peel adhesion in ounces per inch width of tape is the force required to strip the tape at 75° F. from the panel at a rate of 12 inches per minute.

Shear adhesion of the pressure-sensitive adhesives in determined using Test PSTC–7, the official test of the Pressure-Sensitive Tape Council. For this test, pressure sensitive adhesive tape samples are prepared as in Test PSTC–1, cut into ½ inch width tapes, a ½-inch x ½-inch area of the tape adhered to a stainless steel test panel supported 2% from vertical, and a 1000 gram weight secured to the free hanging end of the tape. The shear adhesion of the tape is the time required for the tape to separate from the test panel. When tested, many of the adhesives of this invention were still securely adhered when the test was discontinued after 5000 minutes, these adhesives being assigned a shear adhesion value of 5000+.

The following examples, in which all parts are by weight unless otherwise indicated, further illustrate the invention without limiting the scope thereof.

Example 1

A 500-ml. indented resin flask fitted with a stirrer, condenser, thermometer and means for introducing nitrogen was charged with 68.0 g. iso-octyl acrylate (a mixture of the acrylates of the isomeric octyl alcohols), 5.2 g. 1,1-dimethyl-1-(2-hydroxypropyl)amine methacrylimide, 160 ml. deoxygenated water and 2.2 g. sodium dodecylbenzene sulfonate, purged with nitrogen, and 0.30 g. potassium persulfate added. Then, while stirring and maintaining a nitrogen atmosphere, the emulsion was heated to 60° C. and maintained for 24 hours after which the latex was coagulated with methanol and the polymer purified by dissolving in a 7:3 n-heptane:isopropanol mixture and precipitating with methanol. After drying, nitrogen analysis indicated the copolymer contained 3.3% by weight of 1,1 - dimethyl-1-(2-hydroxypropyl)amine methacrylimide. The copolymer had an intrinsic viscosity of 1.85 dl./g. in n-butanol, a tack maximum of 150 g. at −30° C., a shear strength of 5000+ minutes and a peel strength of 38.5 oz./inch width.

Example I was repeated using reduced amounts of zwitterionic monomer. The copolymers obtained had excellent adhesive properties down to those copolymers having about 1.0% of zwitterionic monomer. Similar results were obtained when cationic surfactants such as n-(laurylcoamino formylmethyl) pyridinium chloride (commercially available from the Witco Chemical Company under the trade designation "Emcol E–607") or an alkylaryl-polyethylene oxide (commercially available from the Rohm and Haas Company under the trade designation "Triton X–305") were employed.

Examples 2–8

The procedure in Example I was repeated using 67 g. 2-methylbutyl acrylate and 6.5 g. of 1,1-dimethyl-1-(2-hydroxy-1-propyl)amine methacrylamide. Analysis of the polymer obtained indicated it contained 7.5% by weight methacrylimide. The copolymer had an intrinsic viscosity of 4.6 dl./g. in 8:2 tetrahydrofuran:methanol, a tack maximum of 100 g. at −15° C., a shear strength of 5000+ minutes and a peel strength of 43.4 oz./inch.

Additional copolymers of 1,1-dimethyl-1-(2-hydroxy-1-propyl)amine methacrylimide were prepared by the procedure used in Example 1 utilizing various acrylic esters, the amounts used and the percentages of zwitterionic monomer contained in the polymera isolated were:

| Example No. | Acrylic ester | Percent zwitterionic component in the polymer |
|---|---|---|
| 3 | 67.0 g. 2-(4-methyl)pentyl acrylate | 4.0 |
| 4 | 59.4 g. n-octyl acrylate | 4.7 |
| 5 | 111.0 g. n-decyl acrylate | 3.4 |
| 6 | 88.0 g. 6-methoxy acrylate | 3.2 |
| 7 | 174.0 g. 10-chlorodecyl methacrylate | 1.4 |
| 8 | 118 g. n-dodecyl methacrylate | 2.5 |

The copolymers of Examples 3–8 displayed excellent shear creep resistance, good peel adhesion, and excellent adhesion to kraft paper.

Examples 9–14

These examples illustrate copolymers of a preferred acrylate monomer and various hydroxyalkylamine methacrylimide zwitterion monomers.

The procedure described in Example 1 was repeated using 52.5 g. iso-octyl acrylate, 3.85 g. 1,1-dimethyl-1-(2-hydroxyoctyl)amine methacrylimide 150 ml. deoxygenated water, 2.2 g. sodium dodecylbenzenesulfonate, 0.17 g. potassium persulfate, and 0.085 g. sodium bisulfite. Analysis indicated the resultant copolymer contained 4.5% by weight copolymerized 1,1-dimethyl-1-(2-hydroxyoctyl)amine methacrylimide, had an intrinsic viscosity of 5.7 dl./g. in tetrahydrofuran, peel strength of 51.4 oz./inch, shear strength greater than 5000 minutes, and a tack maximum of 175 g. at −25° C.

Other copolymers of iso-octyl acrylate were prepared by the procedure used in Example 9 utilizing various methacrylimides. The amounts used and the specific monomers used were

| Example No. | Hydroxyalkylaminimide | Percent zwitterionic component in the polymer |
|---|---|---|
| 10 | 1,1-dimethyl-1-(2-hydroxypentyl) amine methacrylimide. | 6.7 |
| 11 | 1,1-dimethyl-1-(2-hydroxydodecyl) amine methacrylimide. | 6.7 |
| 12 | 1,1-dimethyl-1-(2,3-dihydroxypropyl) amine methacrylimide. | 6.7 |
| 13 | 1,1-dimethyl-1-(2-hydroxy-3-phenoxypropyl) amine methacrylimide. | 6.7 |
| 14 | 1,1-dimethyl-1-(2-hydroxy-3-isopropoxypropyl)amine methacrylimide. | 6.7 |

The copolymers of Examples 10–14 displayed good tack, excellent resistance to creep in shear, and good peel adhesion.

Example 15

The procedure of Example 1 was repeated using 47.5 g. iso-octyl acrylate, 2.5 g. 4-[(2-methacryloxyethyl)-dimethylammonium] propane sulfonate betaine, 150 ml. deoxygenated water, 2.0 g. sodium salt of alkylarylpolyethylene oxide sulfate (commercially available from the Rohm and Haas Company under the trade designation "Triton X–200") surfactant, 0.30 g. potassium persulfate and 0.15 g. sodium bisulfite, and the emulsion stirred at ambient temperature for 18 hours. The latex was coagulated with methanol, purified by two precipitations from benzene solution with methanol, yielding a tough, tacky elastomer having an intrinsic viscosity of 3.5 dl./g. in 95:5 benzene:methanol. Analysis indicated the copolymer contained 3.1% sulfobetaine, having a tack maximum of 100 g. at −20° C., a peel strength of 25.6 and a shear strength greater than 5000 minutes.

EXAMPLE 16

Example 15 was repeated using 3-[(2-methacryloxyethyl-dimethylammonium] propionate betaine as the zwitterionic monomer, the copolymer containing 1% carboxybetaine by weight. This polymer also had good resistance to creep in shear, good peel adhesion, and a tack maximum of 130 g. at −32° C.

Example 17

The procedure of Example 1 was repeated using 39.2 g. iso-octyl acrylate, 0.8 g. betaine having the formula:

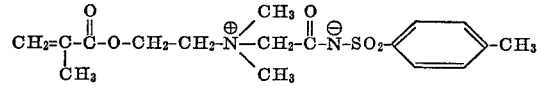

90 ml. deoxygenated water, 1.6 g. sodium p-dodecylbenzene-sulfonate, and 0.15 g. potassium persulfate. The isolated polymer had an intrinsic viscosity of 2.3 dl./g. in 9:1 tetrahydrofuran:methanol. Analysis indicated 3.9% betaine by weight of betaine in the copolymer, a tack maximum of 150 g. at −25° C., excellent resistance to creep in shear and good peel adhesion.

Example 18

Examples 18 and 19 illustrate copolymers of a preferred acrylate monomer and various trimethylamine substituted zwitterionic monomers.

The procedure of Example 1 was repeated using 35.0 g. iso-octyl acrylate, 2.04 g. trimethylamine p-vinylbenzimide, 130 ml. of deoxygenated water, 3 g. of the surfacant used in Example 15, and 0.15 g. potassium persulfate. The copolymer was purified by precipitation from 2-butanone with methanol. Analysis indicated 4.4% by weight aminimide, a tack maximum of 50 g. at −20° C., good peel adhesion and excellent resistance to creep in shear.

Example 19

Example 18 was repeated using 41.0 g. iso-octyl acrylate and 3.8 g. trimethylamine methacrylimide, the resultant copolymer containing 1.7% by weight trimethylamine methacrylimide as indicated by nitrogen analysis. The copolymer had a tack maximum of 268 g. at −31° C., good resistance to creep in shear and particularly good peel adhesion.

Examples 20 through 29 illustrate terpolymers prepared from a preferred acrylate monomer, preferred zwitterionic monomers, and various other monomers.

Examples 20–25

A pressure-sensitive adhesive terpolymer was prepared using the procedure of Example 1 by charging 87 g. iso-octyl acrylate, 64 g. 2-methylbutyl acrylate, 18.6 g. 1,1-dimethyl-1-(2-hydroxypropyl)amine methacrylimide, 425 ml. deoxygenated water, 6.5 g. of sodium p-dodecylbenzenesulfonate, and 0.6 g. potassium persulfate. Elemental analysis of the resultant terpolymer indicated 47.5 mol percent iso-octyl acrylate and methylbutyl acrylate and 5 mol percent aminimide corresponding to a terpolymer containing 5.7% aminimide by weight. The terpolymer had an intrinsic viscosity of 4.7 dl./g. in 8:2 2-butanone: methanol, a tack maximum of 100 g. at —20° C., a peel strength of 44.8 and a shear strength greater than 5000 minutes.

Using the procedure of Example 20, terpolymers were prepared using charges of 45 g. iso-octyl acrylate, 2.5 g. 1,1 - dimethyl-1-(2-hydroxypropyl)amine methacrylimide, 1.0 g. sodium p-dodecyl-benzenesulfonate, a catalyst mixture of 0.15 g. potassium persulfate and 0.075 g. sodium bisulfite, and the following components:

| Example No. | Monomer | Intrinsic viscosity [1] | Maximum tack, g. at ° C. |
|---|---|---|---|
| 21 | 2.5 g. styrene | 3.55 | 100 at —20. |
| 22 | 4.0 g. vinyl acetate | 3.50 | 150 at —31. |
| 23 | 2.5 g. methyl methacrylate | 3.0 | 249 at —29. |
| 24 | 2.15 g. methyl methacrylate | 3.25 | |
| 25 | 2.0 g. t-butyl acrylamide | 3.0 | 150 at —30. |

[1] In 7:3 heptane-isopropanol.

The terpolymers of Examples 20 through 25 showed excellent resistance to creep in shear and good peel adhesion.

Example 26

A pressure sensitive terpolymer was prepared using the procedure of Example 3 by charging 150 g. iso-octyl acrylate, 30 g. freshly distilled vinyl acetate, 20 g. 1,1-dimethyl-1-(2-hydroxyoctyl)amine methacrylimide, 600 ml. deoxygenated water, 4.0 g. sodium dodecylbenzenesulfonate, 0.800 g. potassium persulfate and 0.400 g. sodium bisulfite. Elemental analysis indicated 5.1% aminimide incorporated in the terpolymer, which showed peel adhesion of 38 oz./½ inch, room temperature shear strength greater than 19,000 minutes and shear at 150° F. greater than 1000 minutes.

In like manner, terpolymers were prepared by polymerizing 39 g. iso-octyl acrylate and 3.5 g. 1,1-dimethyl-1-(2-hydroxyoctyl)amine methacrylimide with (a) 7.5 g. methyl methacrylate, (b) 7.5 g. methyl acrylate, (c) 7.5 g. ethyl acrylate, and (d) 7.5 g. acrylonitrile. Each of the terpolymers showed greater than 10,000 minutes shear at room temperature and the following shear strengths at 150° F.; (a) greater than 1000 minutes, (b) greater than 1000 minutes, (a) 478 minutes, respectively.

For purposes of comparison, acrylic acid esters polymerized without the addition of zwitterionic monomer have the following characteristics:

| | Intrinsic viscosity [1] | Maximum tack, g. at ° C. | Shear strength |
|---|---|---|---|
| Homopolymer from— | | | |
| iso-Octyl acrylate | 5.5 | 304 at —30 | 12 min. |
| n-Octyl acrylate | 3.0 | 120 at —30 | 4 min. |
| 6-methoxyhexyl acrylate | 2.95 | 180 at —45 | 4 min. |
| 11-cyclohexylundecyl acrylate | 1.55 | 240 at —25 | 4 min. |
| 11-phenylundecyl acrylate | 2.1 | 165 at— 12 | Very low. |
| Acrylic acid copolymers: iso-octyl acrylate: acrylic acid 95.5:4.5. | 3.58 | 80 at 18 | 100 min. |

[1] In tetrahydrofuran.

The advantages of the invention may readily be seen from the above data in the fact that homopolymers of acrylic acid esters have shear strengths much less than the zwitterionic copolymers of the invention. Variations may be made in proportions, procedures and materials without departing from the scope of the invention.

We claim:
1. Normally tacky and pressure-sensitive adhesive compositions consisting essentially of a copolymer of (1) 80 to 99 weight percent of at least one terminally unsaturated vinyl monomer selected from the group consisting of acrylic acid esters of alcohols containing 5 to 17 carbon atoms, methacrylic acid esters of alcohols containing 8 to 17 carbon atoms, and vinyl esters derived from carboxylic acids containing 4 to 13 carbon atoms, and (2) 20 to 1 weight percent of at least one terminally unsaturated zwitterionic monomer selected from the group consisting of

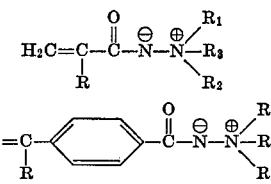

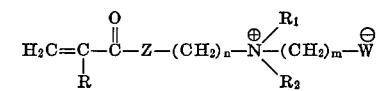

and $$H_2C=C-\overset{O}{\overset{\|}{C}}-Z-(CH_2)_n-\overset{R_1}{\overset{\oplus}{\underset{R_2}{N}}}-(CH_2)_m-\overset{\ominus}{W}$$

wherein
R represents a hydrogen atom, a lower alkyl group containing 1 to 10 carbon atoms, or a phenyl group;
$R_1$ and $R_2$ represents the same or different alkyl groups containing 1 to 10 carbon atoms or together represent a single divalent group that with nitrogen forms a heterocyclic ring;
$R_3$ represents a lower alkyl group, phenylalkyl group, a 2-hydroxyalkyl group, a 2,3-dihydroxyalkyl group, a 2-hydroxyalkylphenyl group, a 2,3-dihydroxyalkylphenyl group, a 2-hydroxyalkoxyalkyl group, a 2-hydroxyalkylphenylether group wherein the alkyl group contains 1 to 10 carbon atoms inclusively;
Z represents —O—, —S—, or —NH—;
$n$ is an integer from 1 to 5 inclusively;
$m$ is an integer from 1 to 8 inclusively; and
$W^\ominus$ represents a negatively charged radical selected from the group consisting of

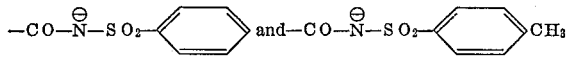

2. Composition of claim 1 wherein said ester is iso-octyl acrylate.
3. Composition of claim 1 wherein the zwitterionic monomer is selected from the group consisting of trimethylamine methacrylimide,
1,1-dimethyl-1-(2-hydroxpropyl)amine methacrylimide,
1,1-dimethyl-1-(2,3-dihydroxypropyl)amine methacrylimide,
1,1-dimethyl-1-(2-hydroxybutyl)amine methacrylimide,
1,1-dimethyl-1-(2-hydroxyoctyl)amine methacrylimide,
trimethylamine 4-vinyl benzimide,
1,1-dimethyl-1-(2-hydroxy-3-phenoxypropyl)amine methacrylimide, and
1,1-dimethyl-1-(2-hydroxy-2-phenylethyl)amine methacrylimide.
4. A normally tacky and pressure-sensitive adhesive composition in accordance with claim 1 wherein the weight percent of vinyl monomer is at least 90 and the weight percent of zwitterionic monomer is not more than 10.

5. Composition of claim 4 wherein said vinyl monomer is iso-octyl acrylate and said zwitterionic monomer is 1,1-dimethyl-1-(2-hydroxypropyl)amine methacrylimide.

6. Composition of claim 4 wherein said vinyl monomer dimethyl-1-(2-hydroxy - 3 - phenoxypropyl)amine methacrylimide.

7. Composition of claim 4 wherein said vinyl monomer is iso-octyl acrylate and said zwitterionic monomer is 1,1-is iso-octyl acrylate an dsaid zwitterionic monomer is 1,1-dimethyl-1-(2-hydroxyoctyl)amine methacrylimide.

8. Composition of claim 7 additionally containing, a minor amount, on the order of 5% to 20% by weight, of terpolymerized vinyl acetate.

References Cited
UNITED STATES PATENTS
3,691,140  9/1972  Spencer _____ 260—78.5

JOSEPH L. SCHOFER, Primary Examiner
S. M. LEVIN, Assistant Examiner

U.S. Cl. X.R.
117—138.8 F, 138.8 UA, 155; 260—33.4 R, 79.3 MU, 79.7, 80.72, 85.7, 86.1 N

UNITED STATES PATENT OFFICE
CERTIFICATE OF CORRECTION

Patent No. 3,770,708  Dated November 6, 1973

Inventor(s) Hanspeter Knoepfel and Spencer F. Silver

It is certified that error appears in the above-identified patent and that said Letters Patent are hereby corrected as shown below:

Col. 2, line 51, "hexane" should be -- hexanol --; line 64, after "to" (second occurrence) insert -- 12 --.

Col. 3, line 69, "inclusively" should be -- inclusive --.

Col. 4, Formula IIa should be -- 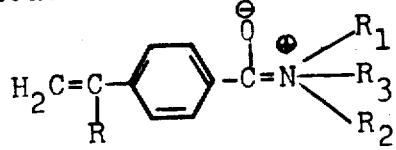

lines 40-42, delete -- 1-(2-hydroxy-3...methacrylimide.--

Col. 7, line 17, "polymera" should be -- polymer --.

Col. 8, line 54, delete "of" (first occurrence); lines 54-55, "surfacant" should be -- surfactant --.

Col. 9, line 55, "(a)" should be -- (c) --.

Col. 10, claim 3, line 62, "(2-hydroxpropyl)" should be -- (2-hydroxypropyl) --.

Col. 11, claims 6 and 7 should read as follows:

6. Composition of claim 4 wherein said vinyl monomer is iso-octyl acrylate and said zwitterionic monomer is 1,1-dimethyl-1-(2-hydroxyoctyl) amine methacrylimide.

7. Composition of claim 4 wherein said vinyl monomer is iso-octyl acrylate and said zwitterionic monomer is 1,1-dimethyl-1-(2-hydroxy-3-phenoxypropyl)amine methacrylimide.

Signed and sealed this 9th day of July 1974.

(SEAL)
Attest:

McCOY M. GIBSON, JR.
Attesting Officer

C. MARSHALL DANN
Commissioner of Patents